Aug. 9, 1966 W. HERTERICH 3,265,816

MULTI-POSITION HEAD FOR MAGNETIC RECORDERS

Filed June 13, 1961

INVENTOR
WALTER HERTERICH
by Walter S. Bleston
ATTORNEY 3,265,816
MULTI-POSITION HEAD FOR MAGNETIC RECORDERS
Walter Herterich, 7 L.v. Herterichstrasse, Dachau, Germany
Filed June 13, 1961, Ser. No. 116,799
6 Claims. (Cl. 179—100.2)

Figure 1:
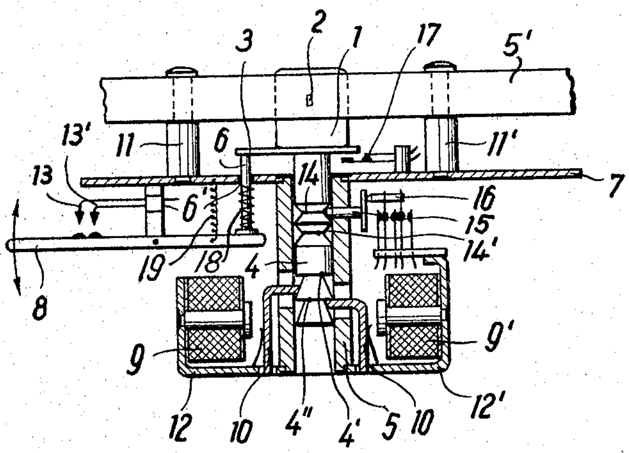

It is known to record and reproduce a number of tracks on a single tape in a tape recorder, and it is also known to reverse the direction of tape movement so that the end of the first track is adjacent the beginning of the second track. Devices are also known which enable the transducer or pickup head to be raised or lowered to register with the various tracks, use generally being made of an electric stepping mechanism operated by conductive contact strips provided at the end portions of the tape.

The known arrangements have the disadvantage that if repeated contact occurs, for instance, if there is a loose contact, the tape may be stepped by more than one track. This impairs the reliability of the tape recorders in an absolutely unsatisfactory manner.

It is an object of this invention to obviate this disadvantage and to ensure that, even though the contact strip in the tape may come into operation a number of times, only a single change-over is made to the immediately succeeding track.

In the control device according to the invention, two electromagnets are provided, each co-operating with a respective locking pawl coacting with a vertically adjustable spindle or shift rod formed with peripheral grooves. The pickup head is disposed on such spindle or shift rod. The locking pawls operate alternately, so that the first such pawl is operated for the first change-over and the second is operated for the next change-over. The two electromagnets are each associated with a respective tape contact disposed the one to the left and the other to the right of the pickup head, so that only that tape contact is operated on the side where the contact strip first arrives. The operation of the two tape contacts therefore varies with the direction of tape motion. Also, a locking pawl cannot operate once it has already operated, since the locking pawl of the other magnet is in engagement with the shift rod.

The tape drive for the system according to the invention must be so devised that the direction of tape motion is governed solely by the direction of motor rotation. Conveniently, therefore, a motor reversing switch of the recorder is operated by a feeler pin controlled by peripheral grooves in the shift rod—i.e., the direction of tape motion is determined by the height of the pickup head is lowered and operates a contact to switch off the complete device.

The automatic changing over from track to track hereinbefore described may be arranged also so that it may be carried into effect manually by a lever, more particularly in order that the tape recorder may be set rapidly to a desired track when it is reproducing. An improvement in this respect can be provided by using press-buttons. A resilient tape-pressing device which is vertically stationary provides a braking action in relation to the head in order to reduce the rate at which the same slides downwards, thus reducing chatter at the pawls.

Figure 2:
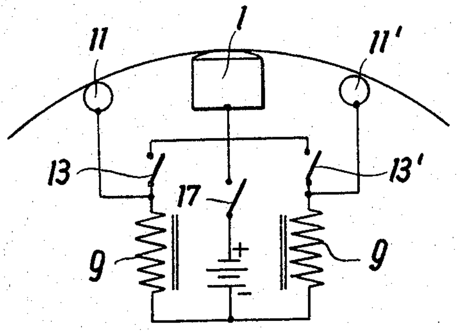

The invention will be described further, by way of example with reference to the accompanying drawings, in which:

FIG. 1 is a part-sectional fragmentary side elevation showing a recorder constructed according to the invention; and FIG. 2 is a circuit diagram corresponding to FIG. 1.

FIGURES 1 and 2 illustrate an embodiment of the invention comprising two magnetic windings. A pickup head 1 formed with a gap 2 is secured to a carrier plate 3 mounted on a spindle 4 which is accurately machined to a cylindrical shape. The spindle 4, which constitutes a shift rod, can move vertically in a bush 5 without play. To prevent the head 1 from rotating about its axis, a pin 6 is secured to the carrier plate 3 and engages an aperture 6' in a base plate 7 of the recorder. This arrangement is one of the simplest and best ways of enabling the head to be displaced vertically without play and in parallel fashion, and also has the advantage that it is very cheap to produce. The head 1 is urged downward in the bush 5 by a biasing spring 18 coiled about the pin 6. One end of the spring 18 is secured to the pin 6, the other end abuts against the underside of the base plate 7.

The height of the head 1 is varied by a stepping mechanism. The spindle 4 is formed with circumferential grooves 4', 4'', which in their spacing from one another correspond exactly to twice the spacing between two tracks on the tape. Before the tape recorder is started, the head 1 is moved into a top raised position, for instance, by a lever 8 urged against the lower end of pin 6 by a spring 19, and two electro-magnets 9, 9' are provided to enable the head 1 to descend stepwise.

The device comprises two tape guide rollers 11 and 11' which also act as contacts, and the two magnets 9, 9' are provided with yokes 12, 12' by which they are connected to the bush 5, the magnet 9 being associated with a pawl-like armature 10, and the magnet 9' being associated with a pawl-like armature 10'. In FIGURES 1 and 2, the head 1 is shown as being in register with the third track of the tape 5' for scanning the same, and it is assumed that the tape is moving in its path from right to left. A contact strip (not visible) on the tape therefore reaches the guide roller 11' first and thus closes the circuit to the electromagnet 9' through the roller 11' and the head 1 with the result that, as can readily be seen in FIGURE 2, the magnet 9' is energised and attracts the armature 10', whereupon the head 1 descends until the groove 4' abuts the armature 10, so that the head moves down to register with the next track. When such track is completed, the magnet 9 is energised when the contact strip on the tape connects across the roller 11 and the head 1, and the head then descends by one more track until the next groove 4' abuts the armature 10'.

The lever 8 is adapted for manual setting of the head 1 to the various tracks and for returning the head 1 to its terminal top position corresponding with the first track on the tape. When the left-hand part of the lever 8 is pushed up against the resistance of the spring 19, two contacts 13, 13' provided on such lever 8 are closed, the two magnets 9, 9' are both energised and the head 1 drops right down to its terminal bottom position, whereafter the head 1 can be set to any desired track just by pressing the left-hand end part of the lever 8.

The spindle 4 is formed with further peripheral grooves 14, 14' the purpose of which is to control the direction of motor rotation automatically in dependence upon the track being used—i.e., in accordance with the height of the head 1 and of the spindle 4. A feeler pin 15 mounted in the bush 5 senses the peripheral grooves 14, 14'. This feeler pin 15, which protrudes through the bush 5 a greater or lesser amount in accordance with the position of the spindle 4, operates a motor reversing switch 16 which preferably takes the form of a leaf spring assembly. When recording or play-back of the final track of the tape is completed, the contact strip of the tape bridges the head 1 and the contact or guide roller 11, the electromagnet 9 is energised and the head 1 descends from the level of the last track and opens a stop switch 17 to switch off the complete device.

Another and unexpected advantage of the invention is that during rapid rewinding where the tape is progressed by a reversing transmission, the tape contacts constituted by the rollers 11, and 11' and the head 1 are closed at the end of rewinding so that the head 1 drops into its bottom position and operates the stop switch 17 to switch off the recorder automatically. This is a very desirable feature for fast rewinding since there would be no point in providing for subsequent rapid rewinding along other tracks of the tape.

I claim:

1. In a magnetic transducing device, in combination:

(a) a support defining a path for a magnetic tape;

(b) motor means for moving said tape in said path;

(c) a transducer head for scanning said tape while said tape moves in said path;

(d) shift rod means movable on said support, said rod means being connected to said head for joint movement and biased to move on said support for actuating movement of said head in a direction transverse of said path, said shift rod means being formed with a plurality of grooves spaced in said direction;

(e) first and second electrically releasable pawl means normally engaging said grooves for arresting said movement of said head in respective scanning positions spaced in siad transverse direction;

(f) first contact means engageable with said moving tape and in circuit with said first pawl means for releasing the same responsive to movement of a conductive portion of said tape in said path in one direction; and (g) second contact means engageable with said moving tape and in circuit with said second pawl means for releasing the same responsive to movement of a conductive portion of said tape in said path in a direction opposite to said one direction.

2. In a device as set forth in claim 1, manually operated means for moving said transducer head between said scanning positions thereof.

3. In a device as set forth in claim 1, reversing switch means in circuit with said motor means, said switch means including a feeler member engaging said rod means, and being responsive to said positions of said head for controlling the direction of movement of said tape in said path.

4. In a device as set forth in claim 1, switch means in circuit with said motor means and responsive to movement of said head in said transverse direction beyond said spaced positions for arresting movement of said tape.

5. In a device as set forth in claim 1, manually operated actuating means for moving said head between two terminal positions respectively spaced from said scanning positions thereof in said transverse direction and in a direction opposite to said transverse direction, and yieldably resilient means permanently opposing manual operation of said actuating means.

6. In a device as set forth in claim 1, said rod means having a portion of circular cross section about an axis parallel to said transverse direction and being movably received in a conforming recess of said support, and a pin member secured to said rod means and spaced from said axis, said pin member being elongated in a direction parallel to said axis and slidably received in a recess of said support for preventing rotation of said rod means about said axis.

References Cited by the Examiner

UNITED STATES PATENTS

| | | | |
|---|---|---|---|
| 2,513,423 | 7/1950 | Owens | 179—100.2 |
| 2,668,059 | 2/1954 | Roberts | 179—100.2 |
| 2,857,164 | 10/1958 | Camras | 179—100.2 |
| 2,898,113 | 8/1959 | Namenyi-Katz | 179—100.2 |

BERNARD KONICK, *Primary Examiner.*

ELI J. SAX, *Examiner.*

D. G. REDINBAUGH, J. R. GOUDEAU, *Assistant Examiners.*